Nov. 10, 1936.  G. R. GOIN  2,060,066
TRAILER DRAFT CONNECTION
Filed July 29, 1935  2 Sheets-Sheet 1
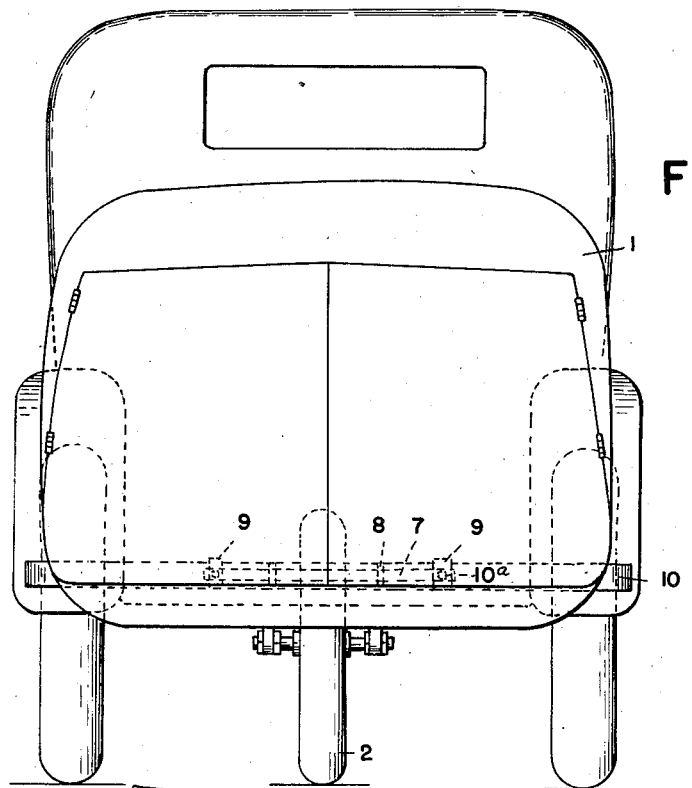
FIG.I.
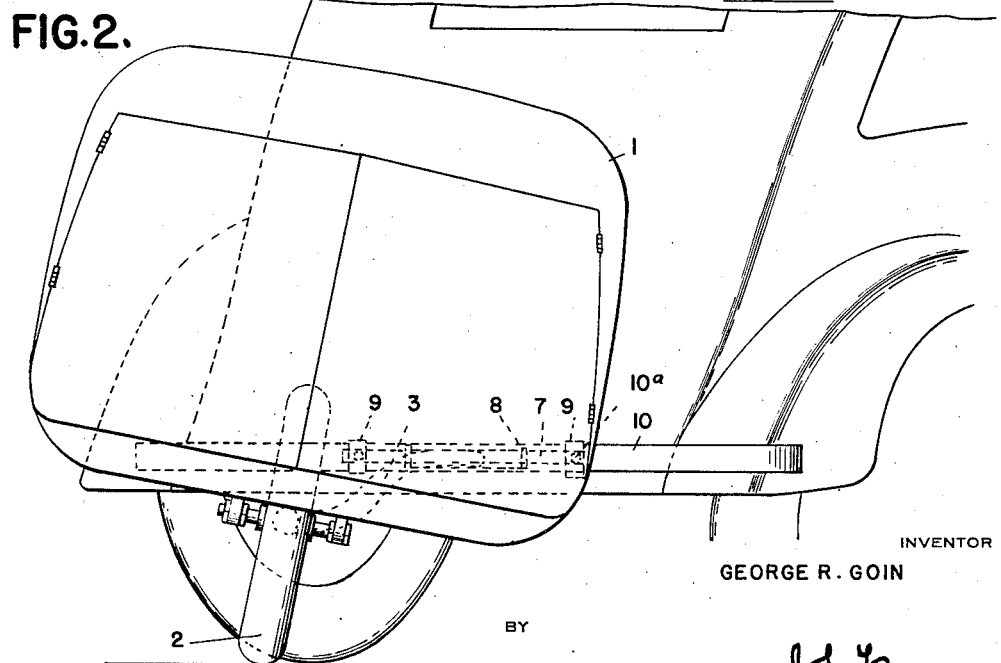
FIG.2.
INVENTOR
GEORGE R. GOIN
BY
J.S. Murray
ATTORNEY Nov. 10, 1936.　　　　G. R. GOIN　　　　2,060,066
TRAILER DRAFT CONNECTION
Filed July 29, 1935　　　　2 Sheets-Sheet 2
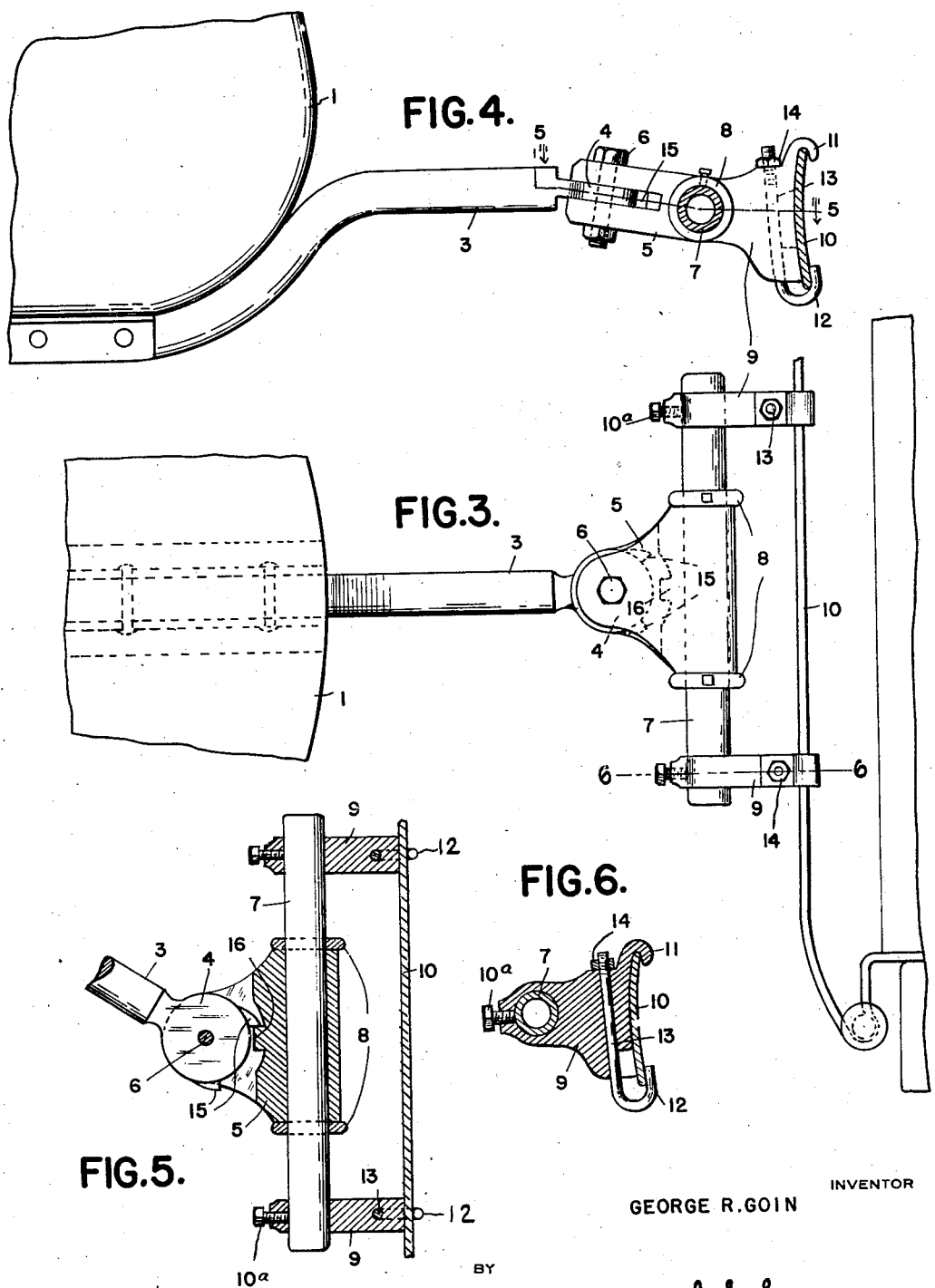
INVENTOR
GEORGE R. GOIN Patented Nov. 10, 1936

2,060,066

UNITED STATES PATENT OFFICE 2,060,066

TRAILER DRAFT CONNECTION

George R. Goin, Detroit, Mich.

Application July 29, 1935, Serial No. 33,691

7 Claims. (Cl. 280—33.44)

This invention relates to trailer draft connections and particularly draft connections for single-wheeled trailers.

An object of the invention is to adapt the draft connection of a single-wheeled trailer to effect an automatic tilting of the trailer, when being drawn around a curve, as in turning a corner, so as to largely counteract the tilting tendency imposed under such conditions by centrifugal force.

Another object is to provide a draft connection for a trailer, adapting it for convenient attachment to the rear bumper of a motor vehicle.

A further object is to establish, in a trailer draft connection, an axis for relative lateral swinging of the trailer and towing vehicle, and to adapt said connection to positively limit the amount of lateral swing.

These and various other objects the invention attains by the construction hereinafter described and illustrated in the accompanying drawings, wherein:

Fig. 1 is a rear view of the trailer and towing vehicle, showing their positions for straight-ahead travel.

Fig. 2 is a similar view showing the tilted position assumed by the trailer in rounding a turn.

Fig. 3 is a top plan view of the draft connection.

Fig. 4 is a view of said connection in side elevation.

Fig. 5 is a sectional detail of the connection taken upon the line 5—5 of Fig. 4.

Fig. 6 is a vertical sectional view of one of a pair of clevises, the section being taken on the line 6—6 of Fig. 3.

In these views, the reference character 1 designates a trailer body, mounted upon a single road wheel 2, positioned substantially midway between the trailer sides.

Secured to said body, therebeneath, and forwardly projecting therefrom is a draw bar 3, formed preferably of a length of heavy metal tubing. Preferably such bar has a gradual curvature, of ogee form, giving it a slight upward extent adjacent to the front wall of said body. In projecting forwardly from its upwardly bent portion, the bar has a slight downward inclination, amounting in the illustrated construction to approximately eleven degrees.

The front end of the draw bar rigidly carries a circular plate 4, having its axis transverse to said downwardly inclined portion of the bar, and in the vertical plane of said portion. Embracing the plate 4, is the forked rear end of a coupling member 5, which is swivelly connected to said plate by a bolt 6, arranged axially of said plate. The front portion of the member 5 is swiveled upon the central portion of a cylindrical coupling pin 7, being restrained from shifting lengthwise of said pin by a pair of set collars 8. The end portions of the pin 7 carry a pair of clevises 9 adapted to be clamped to one of the bumper bars 10 of a motor vehicle. Set screws 10a hold the clevises at a desired distance from the ends of the pin 7, and further restrain the pin from rotation in the clevises.

Each clevis projects forwardly from the pin 7, and carries upper and lower hooked jaws 11 and 12 for clamping engagement with the bumper bar 10. Preferably the upper jaws 11 are integral portions of the clevises, while the lower jaws are terminally formed on approximately vertical rods 13, passing freely through the clevis bodies and having their upper ends threaded for engagement by nuts 14, seating on said bodies. Thus by tightening said nuts, the paired jaws may be drawn together to firmly grip a bumper bar.

Swinging of the trailer about the axis established by the bolt 6, is limited by forming the plate 4 peripherally with a pair of spaced lugs 15, between which engages a lug 16 rearwardly projecting upon the member 5. The arrangement is such that the lug 16 engages one or the other of the lugs 15, upon a lateral swinging of the trailer in either direction, amounting to approximately forty degrees.

It will appear, from the foregoing, that the described draft connection affords relative angular movement between a power vehicle and a trailer about two relatively transverse axes. One of these, established by the coupling pin 7, is normally horizontal and transverse to the direction of normal draft, and affords that flexibility to the connection that is required by rough roads, or any fairly sharp changes of level in the roadway. The other, established by the bolt 6, has a moderate rearward inclination from top to bottom, and affords such relative angular movement between the two vehicles as is necessary in laterally varying the direction of travel. The inclination of the bolt 6 from the vertical procures an important advantage, in a single wheeled trailer. As is well known, travel of a vehicle around a corner or any fairly sharp curve brings into effect a centrifugal force proportionate in amount to the speed of travel and to the angularity of the turn. This force in the case of a vehicle whose width of wheel base approximates zero, acts powerfully to tilt the vehicle laterally, and in single wheel trailers as heretofore constructed has necessitated a draft connection built very strongly to resist such tilting. Even when so built, there has been no elimination of the risk of breakage in swinging the trailer around a short radius curve at considerable speed. The present construction, during travel around a curve, acts as clearly appears in Fig. 2, to automatically tilt the trailer toward the center of curvature, and hence in a direction to counteract the centrifugal effect. The principle applied is that which induces a bicycle rider to tilt his vehicle considerably toward the center of curvature in rounding a curve. Automatically tilting the trailer as described avoids imposing heavy torsional strains on the draft connection, and permits a considerably greater safe speed of travel around curves than would otherwise be possible.

The described provision for attaching the trailer to the rear bumper rather than to the axle of the towing vehicle, or directly to the body of such vehicle, avoids imposing undue draft strains on the axle, and utilizes resiliency of the bumper in absorbing stresses arising in stopping and starting, or otherwise varying the draft. Also this use of the rear bumper bar avoids need for attachment of any special towing fitting to the power vehicle, and its ready accessibility promotes quick attachment and detachment of the trailer to and from almost any standard motor vehicle.

The term "draw bar", is used in the following claims, in a sense inclusive of any member attachable to a trailer to transmit draft from a towing vehicle, whether said member be a single bar or a frame.

The invention is submitted as including all such modifications and changes as properly come within the scope of the following claims.

What I claim is:

1. In a trailer draft connection, a draw bar rigidly attached to a trailer and having a downwardly inclined end portion, a coupling member swiveled on said end portion to swing laterally about an axis inclined from the vertical and transverse to said end portion, a coupling pin swiveling the coupling member to turn about an axis transverse to the line of draft, and means for attaching the coupling pin to a towing vehicle, the inclination of said axis inducing a lateral tilting of the trailer responsive and proportionate to turning of the coupling member about such axis.

2. In a trailer draft connection, a draw bar attached to a trailer and having a portion downwardly inclined from rear to front, a coupling member swiveled on said inclined portion to turn about an axis inclined from the vertical and transverse to said portion, and means for attaching the coupling member to a towing vehicle, and for restraining it from lateral tilting relative to such vehicle, the inclination of said axis inducing a lateral tilting of the trailer responsive and proportionate to turning of the coupling member about such axis.

3. In a trailer draft connection, a draw bar attached to a trailer and having its front end portion comprising a plate having a downward inclination, a coupling member forked to embrace said plate, means swively connecting the plate and furcations of the coupling member for relative turning about an axis transverse to said plate, and means for attaching the coupling member to a towing vehicle and for restraining it from tilting relative to such vehicle, the inclination of said axis inducing a lateral tilting of the trailer responsive and proportionate to turning of the coupling member about such axis.

4. In a trailer draft connection, a draw bar attached to a trailer and having its front end portion comprising a plate, a coupling member forked to embrace the plate and providing bearing faces engageable with the top and bottom faces of the plate, means connecting said plate and coupling member for relative lateral swinging about a definite axis, a pair of angularly spaced lugs peripherally formed on the plate, a lug on the coupling member between said paired lugs and between the forks of said member coacting with the paired lugs to predeterminedly limit lateral swinging of the coupling member, and means for attaching the coupling member to a towing vehicle.

5. In a trailer draft connection, a draw bar attached to and forwardly projecting from a trailer, and restrained from rotation relative to the trailer about an axis lengthwise of said bar, a coupling member swiveled on said bar to swing laterally about an axis diverging rearwardly from the vertical, as it extends downwardly, and means for connecting the coupling member to a towing vehicle, said means swively engaging the coupling member upon an axis transverse to the line of draft, the inclination of the first mentioned axis inducing a lateral tilting of the trailer responsive and proportionate to turning of the coupling member about such axis.

6. In a trailer draft connection as set forth by claim 5, means rigidly attaching the draw bar to the trailer.

7. In a trailer draft connection, the combination with a towing vehicle and a trailer, of a coupling member, means pivoting the coupling member to the towing vehicle to swing about an axis transverse to such vehicle, and means pivoting the trailer to the coupling member to swing about an axis inclined from the vertical in the direction of travel, whereby the trailer is adapted to be laterally tilted responsive and proportionately to relative lateral turning of the vehicle and trailer.

GEORGE R. GOIN.